United States Patent [19]

Dashow

[11] 4,161,249

[45] Jul. 17, 1979

[54] WEB PRODUCT WITH MARKER AND METHOD OF MANUFACTURE

[75] Inventor: Russell N. Dashow, Glencoe, Ill.

[73] Assignee: RND Company

[21] Appl. No.: 895,992

[22] Filed: Apr. 13, 1978

[51] Int. Cl.$^2$ .................... B65D 85/67; G01D 13/00

[52] U.S. Cl. .................................. 206/459; 116/200; 206/411

[58] Field of Search ...................... 206/394, 411, 459; 242/199; 116/114 R

[56] References Cited

U.S. PATENT DOCUMENTS

| | | | |
|---|---|---|---|
| 2,094,454 | 9/1937 | Keville | 206/459 |
| 2,329,527 | 9/1943 | Golub | 206/411 |
| 2,853,042 | 9/1958 | Rivkin | 116/114 R |
| 3,423,038 | 1/1969 | Katzef et al. | 242/199 |

*Primary Examiner*—William T. Dixson, Jr.
*Attorney, Agent, or Firm*—Dressler, Goldsmith, Clement, Gordon & Shore, Ltd.

[57] ABSTRACT

A web product which is wound into a roll includes a web which is provided with at least one marker to aid a user dispensing the product. The marker extends tranversely across the inside surface of the web, and the web and marker are contrasting colors for visibility.

A method of forming the web product includes the steps of providing a web, positioning a marker transversely across the web at a predetermined location, adhesively securing the marker to the web, and winding the web into a roll. The web and marker are contrasting colors so that the web can be unwound to expose the marker which signifies to a user that a predetermined portion of the length of the web has been unwound.

10 Claims, 3 Drawing Figures

WEB PRODUCT WITH MARKER AND METHOD OF MANUFACTURE

BACKGROUND OF THE INVENTION

This invention pertains to a web product, and a method of forming a web product, which is wound in a roll. More particularly, the web product is marked at predetermined locations so that, when the web is unwound to expose the marker, a user will know that a predetermined portion of the length of the web has been unwound.

Web products are used for many purposes. For example, a roll of pressure-sensitive adhesive-coated tape is a web backing provided with an adhesive coating on one surface. Rolls of tape have many uses, one of which is to wrap the handlebar of a bicycle both for aesthetic purposes and to provide a more grippable surface.

One problem that has been encountered with wound rolls of prior art web products, such as pressure-sensitive tape, is the inability for a user to determine how much tape has been used and how much tape is left in the roll. For example, in wrapping the handlebar of a bicycle with tape, it is preferable to wrap each side of the handlebar separately, which necessitates cutting the tape when one side is completed. With prior art rolls of tape, a user is unable to determine how much tape remains in the roll, and the difficulty is compounded by the fact that the diameter of the roll of tape constantly changes as the tape is unwound.

Due to these problems, manufacturers of prior art rolls of tape that are intended for use in wrapping the handlebar provide two separate rolls of tape—one for each side of the handlebar. It is much more expensive to manufacture and market two rolls of tape than to make a single roll which is twice as long.

SUMMARY OF THE INVENTION

The present invention overcomes the foregoing problems by providing a web product which is marked at predetermined locations to aid a user in dispensing the product.

The web product in accordance with the present invention includes a web of predetermined length and width which is wound into a roll having the predetermined width, and the inside surface of the web has a particular color. A marker is secured to the web along at least one predetermined location and extends transversely across the width of the web. One surface of the marker overlies and contacts the web and the opposite surface of the marker is an exposed surface of a contrasting color. The web can be unwound to expose the marker which signifies to a user that a predetermined portion of the length of the web has been unwound. The user will thereby know the remaining length of the web in the roll.

The web may be provided with an adhesive coating on the inside surface thereof, and the marker can be secured to the web by means of the adhesive coating. The marker can also be provided with an adhesive coating on the exposed surface thereof. The marker may also have an adhesive coating on its inside surface which overlies the web, in which case the marker is secured to the web both by the adhesive coating on the web and the adhesive coating on the surface of the marker overlying the web.

The method of forming a web product in accordance with the present invention includes the steps of providing a web of predetermined length and width and having an inside surface of a first color, positioning a marker transversely across the web at a predetermined location, with the marker having a first surface overlying and contacting the web and an opposing surface of a second color, adhesively securing the marker to the web, and winding the web into a roll in which the inside surface faces inwardly toward the center of the roll, so that the web can be unwound to expose the marker which signifies to the user that a predetermined portion of the length of the web has been unwound.

The method may include the further step of providing an adhesive coating on the inside surface of the web. Also, the web can initially have a relatively large predetermined width, and the method may include the additional step of cutting the web longitudinally into a plurality of webs each having a width smaller than the initial predetermined width.

It is a feature of the present invention that the marker is positioned at a predetermined location with respect to the ends of the web. Accordingly, when the web is unwound to the extent that the marker is exposed, the user by seeing the marker knows that a predetermined portion of the length of the web has been unwound. The user will also know that a predetermined length of web remains in the roll.

DETAILED DESCRIPTION OF THE PREFERRED EMBODIMENTS

Figure 1:
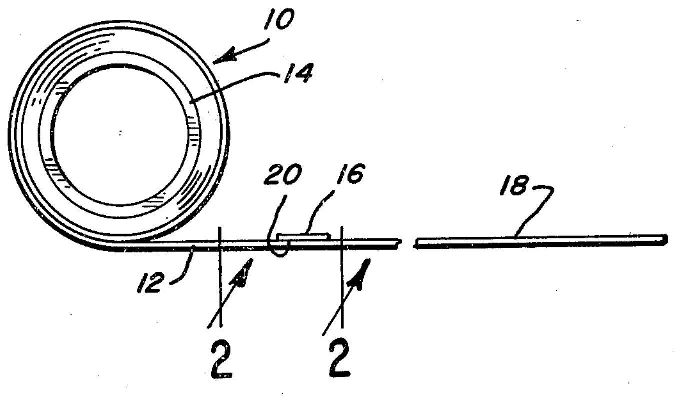
FIG. 1 is a fragmentary front elevational view of the web product of the present invention.
Figure 2:
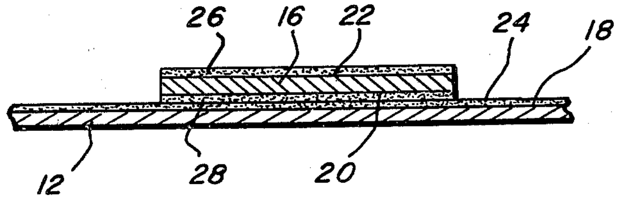
FIG. 2 is an enlarged cross-sectional view taken along plane 2—2 in FIG. 1.

The web product 10 in accordance with the present invention is illustrated in FIGS. 1 and 2. The web product includes a web 12 of predetermined length and width which is wound into a roll having the predetermined width. A support member such as a cardboard ring 14 may be used to provide support for the web which is wound about the ring into a roll.

To facilitate dispensing the wound web product, marking means or marker 16 extends transversely across the web 12 along at least one predetermined location. In the preferred embodiment, the marker 16 is a tape strip which is secured to the inside surface 18 of the web. The marker 16 has a first surface 20 which overlies and contacts the web and an opposing exposed surface 22.

The inside surface 18 of the web and the exposed surface 22 of the marker are contrasting colors so that the marker will be readily visible to a user of the web product. When the web 18 is sufficiently unwound, the marker 16 becomes exposed and signifies to a user that a predetermined portion of the length of the web has been unwound. For example, the marker may be positioned at the midpoint of the web. Since the web has a predetermined length, a user who sees the exposed marker knows that half the roll of web product has been used when the marker is reached and half remains. Two markers can be used to evenly divide the roll into three equal lengths—when the first marker is reached, the user will know that one-third of the web has been used, one-third remains until the second marker is reached and another one-third remains between the second marker and the end of the web. Likewise, any number of markers can be employed in a preconceived arrangement and the markers can be color-coded so that various meanings can be ascribed to each marker.

The web is preferably provided with a pressure-sensitive adhesive coating 24 on the inside surface 18 thereof, as shown in FIG. 2, thereby making the web product a roll of pressure-sensitive tape. The marker 16 is secured to the web 12 by means of the adhesive coating 24.

As depicted in FIG. 2, the marker 16 may be provided with a pressure-sensitive adhesive coating 26 on the exposed surface 22 thereof so that the inside surface of the entire web product is coated with pressure-sensitive adhesive. In addition, the surface 20 of the marker overlying the web may be provided with an adhesive coating 28, so that the marker is secured to the web by means of adhesive coating 24 on the web and adhesive coating 28 on the marker. In the latter case, the marker may comprise a tape strip having layers of pressure-sensitive adhesive on opposing faces thereof.

A method of forming a web product which is marked at predetermined locations in accordance with the present invention includes the steps of providing a web of predetermined length and width and having an inside surface of a first color, positioning a marker transversely across the web at a predetermined location, said marker having a first surface overlying the web and an opposing exposed surface of a second color, adhesively securing said marker to the web, and winding the web into a roll in which the inside surface faces inwardly toward the center of the roll, whereby the web can be unwound to expose the marker which signifies to a user that a predetermined portion of the length of the web has been unwound. Where the web product is a roll of tape, the method includes the further step of providing an adhesive coating on the inside surface of the web.

Figure 3:
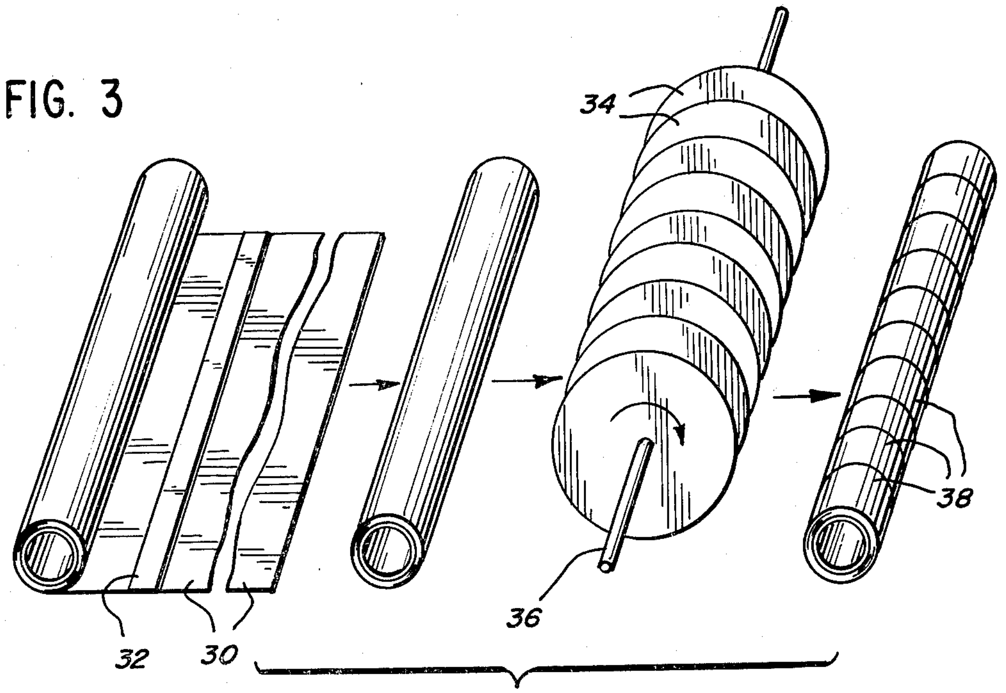
FIG. 3 is a schematic illustration of the process for manufacturing the web product of the present invention.

According to a further feature of the present invention, a plurality of rolls of web product can be manufactured simultaneously, as shown in FIG. 3. To do so, the initial predetermined width of the web 30 approximately equals the combined width of the number of rolls to be manufactured at the same time. A single marker 32 is positioned transversely across the web 30. The method includes the further step of cutting the web longitudinally at predetermined locations to provide a plurality of webs of predetermined width less than the initial width. The web is cut by cutting means such as a plurality of rotating blades 34 mounted on a central shaft 36. A plurality of individual rolls of web product 38 are thereby formed.

For illustrative purposes only, and without intending to limit the scope of the invention, a specific embodiment of the invention will be described. The web product is a roll of tape in which the web is eighteen feet long and three-fourths inch wide. The web is wound about a cardboard ring and has a pressure-sensitive adhesive coating on the inside surface thereof. The marker is a strip of tape three-fourths inch wide which has pressure-sensitive adhesive coatings on opposing faces thereof and is positioned transversely across the width of the web at the midpoint of the web. The inside surface of the web is black and the exposed surface of the tape strip marker is beige.

The web product was manufactured by providing an unwound web eighteen feet long and up to forty-five inches wide. A single tape strip marker was positioned transversely across the open web which was then wound into a roll or log which is then cut into a plurality of individual rolls, each three-fourths inch wide.

One use for which the web product of the present invention is particularly adapted is in wrapping the handlebars of bicycles. For this purpose, the web product is a roll of pressure-sensitive tape having a single marker located at the midpoint. One side of the handlebar is wrapped until the user sees the marker and attempts to complete wrapping the first side of the handlebar as close as possible to the marked midpoint of the roll of tape. The tape is then cut, and the user proceeds to use the remaining half of the roll of tape to wrap the other side of the handlebar.

The above detailed description of this invention has been given for ease of understanding only. No unnecessary limitations should be understood therefrom, as modifications will be obvious to one skilled in the art.

I claim:

1. A web product which is marked at predetermined locations to aid a user dispensing said product, comprising:

an integral web having a predetermined length and a predetermined width between the longitudinal edges of said web, said web being wound into a roll having said width, said web having an inside surface of a first color; and marking means secured to said inside surface of said web along at least one predetermined location intermediate the ends of said web, said marking means extending transversely across said web and being disposed between said longitudinal edges of said web, said marking means having a first surface overlying said web and an opposing exposed surface of a second color;

whereby said web can be unwound to expose said marking means which signifies to a user that a predetermined portion of the length of said web has been unwound.

2. A web as defined in claim 1 wherein said web is provided with an adhesive coating on said inside surface and said marking means is secured to said web by means of said adhesive coating.

3. A web as defined in claim 2 wherein said marking means is provided with an adhesive coating on said exposed surface thereof.

4. A web as defined in claim 2 wherein said marking means comprises a strip of tape provided with adhesive coatings on the opposing major surfaces thereof, whereby said marking means is secured to said web by means of said adhesive coating on said web and said adhesive coating on said surface of said marking means overlying said web.

5. A web as defined in claim 1 wherein said marking means is positioned at the midpoint of the length of said web.

6. A web product which is marked at predetermined locations to aid a user dispensing said product, comprising:

an integral web having a predetermined length and a predetermined width between the longitudinal edges of said web, said web being wound into a roll having said width, said web having an inside surface of a first color; and marking means located on said inside surface of said web along at least one predetermined location intermediate the ends of said web, said marking means extending transversely across said web and being disposed between said longitudinal edges of said web, said marking means having a contrasting color;

whereby said web can be unwound to expose said marking means which signifies to a user that a predetermined portion of the length of said web has been unwound.

7. A method of identifying predetermined lengths in a web product, comprising the steps of providing an integral web of predetermined length and a predetermined width between the longitudinal edges of said web, said web having an inside surface of a first color, positioning marking means transversely across said web at a predetermined location intermediate the ends of said web and being disposed between said longitudinal edges of said web, said marking means having a first surface overlying said web and an opposing exposed surface of a second color, securing said marking means to said web, and winding said web into a roll in which said inside surface faces inwardly toward the center of said roll, whereby said web can be unwound to expose said marking means which signifies to a user that a predetermined portion of the length of said web has been unwound.

8. A method as defined in claim 7 wherein said web initially has a first predetermined width and including the further step of cutting said web longitudinally at predetermined locations to provide a plurality of webs of predetermined width less than said initial width.

9. A method as defined in claim 7 wherein said marking means is adhesively secured to said web.

10. A method as defined in claim 9 including the further step of providing an adhesive coating on said inside surface of said web.

* * * * *